(12) United States Patent
Mao

(10) Patent No.: US 10,996,802 B2
(45) Date of Patent: May 4, 2021

(54) TOUCH SENSING METHOD, TOUCH CHIP, ELECTRONIC DEVICE AND TOUCH SYSTEM

(71) Applicant: SHENZHEN GOODIX TECHNOLOGY CO., LTD., Shenzhen (CN)

(72) Inventor: Zhimin Mao, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/664,775

(22) Filed: Oct. 25, 2019

(65) Prior Publication Data
US 2020/0073510 A1  Mar. 5, 2020

Related U.S. Application Data

(63) Continuation of application No. PCT/CN2018/104209, filed on Sep. 5, 2018.

(51) Int. Cl.
G06F 3/0354 (2013.01)
G06F 3/041 (2006.01)
G06F 3/044 (2006.01)

(52) U.S. Cl.
CPC ........ G06F 3/0442 (2019.05); G06F 3/03545 (2013.01); G06F 3/0446 (2019.05); G06F 3/04162 (2019.05)

(58) Field of Classification Search
CPC ............. G06F 3/03545; G06F 3/04162; G06F 3/04166; G06F 3/0442; G06F 3/0445; G06F 3/0446
See application file for complete search history.

(56) References Cited

U.S. PATENT DOCUMENTS

| 2013/0106777 A1* | 5/2013 | Yilmaz | G06F 21/32 345/174 |
| 2014/0098059 A1* | 4/2014 | Ichikawa | G06F 3/044 345/174 |
| 2014/0300569 A1 | 10/2014 | Matsuki et al. | |
| 2015/0346875 A1* | 12/2015 | Yeh | G06F 3/0441 345/174 |
| 2016/0282965 A1 | 9/2016 | Jensen et al. | |

(Continued)

FOREIGN PATENT DOCUMENTS

| CN | 102855033 A | 1/2013 |
| CN | 103186261 A | 7/2013 |

(Continued)

Primary Examiner — Hong Zhou
(74) Attorney, Agent, or Firm — Brion Raffoul

(57) ABSTRACT

Embodiments of the present disclosure provide a touch sensing method, a touch chip, an electronic device and a touch system. The touch sensing method includes: acquiring a recorded strength threshold of a touch detection signal, and determining a strength of a touch detection signal transmitted between a stylus and a touch screen at a current time; and determining whether the strength of the touch detection signal at the current time is greater than or equal to the acquired strength threshold, and concluding that the stylus is in contact with the touch screen at the current time if the strength of the touch detection signal at the current time is greater than or equal to the strength threshold.

15 Claims, 5 Drawing Sheets

(56) References Cited

U.S. PATENT DOCUMENTS

2017/0131817 A1* 5/2017 Wong .................... G06F 3/0414
2018/0046269 A1  2/2018 Kaplan
2018/0059866 A1* 3/2018 Drake ................... G06F 3/0416
2018/0081536 A1* 3/2018 Ueno ...................... G06F 3/038

FOREIGN PATENT DOCUMENTS

| CN | 104951160   | 9/2015 |
| CN | 105677130 A | 6/2016 |
| EP | 3318962 A1  | 5/2018 |

* cited by examiner

TOUCH SENSING METHOD, TOUCH CHIP, ELECTRONIC DEVICE AND TOUCH SYSTEM

CROSS REFERENCE TO RELATED APPLICATIONS

The present application is a continuation of international application No. PCT/CN2018/104209, filed on Sep. 5, 2018, which is hereby incorporated by reference in its entirety.

TECHNICAL FIELD

Embodiments of the present disclosure relate to the field of touch technologies, and in particular, relates to a touch sensing method, a touch chip, an electronic device and a touch system.

BACKGROUND

Touch inputs are replacing conventional keyboard or keypad inputs, and provide more convenient and quick inputs for users during use of electronic devices, such as mobile phones and tablet computers.

In the related art, in addition to touch operations on the touch screens by hands directly, styluses may also be employed to perform touch operations on the touch screens to further improve user experience. The styluses may be categorized into passive styluses and active styluses by determining whether the styluses are equipped with a power source. The passive stylus simulates a human finger by simply using a conductive article (a conductor or a conductive rubber or the like), and a capacitor is formed between a conductive pin and a drive conductive strip of the touch screen, to affect a detection result of the touch screen. The active stylus, as the name implies, is equipped with a power source. The active styluses may be categorized into electromagnetic resonance (EMR) styluses and capacitive styluses. In the EMR stylus, an inductance sensor layer needs to be arranged on the touch screen, and the write function may be implemented by additional hardware. The capacitive stylus does not need the additional inductor sensor. The capacitive stylus available in the market may be directly used, and a signal generation module is configured in the stylus. The signal generation module may generate a plurality of sinusoidal signals or square wave signals having different frequencies. The signals are coupled to a drive channel and a sensing channel of the touch screen, such that a touch chip detects the positions thereof.

However, in the related art, during use of the capacitive stylus, a specific force needs to be applied to perform an operation on the touch screen. For example, to write on the touch screen, the capacitive stylus may write fluently only after a specific force is applied thereto. As a result, a real writing experience fails to be achieved, and user experience is degraded.

SUMMARY

In view of the above, one technical problem to be solved by embodiments of the present disclosure is to provide a touch sensing method, a touch chip, an electronic device and a touch system, to address the above technical defect in the related art.

Embodiments of the present disclosure provide a touch sensing method. The method includes:
acquiring a strength threshold of a recorded touch detection signal, and determining a strength of a touch detection signal transmitted between a stylus and a touch screen at a current time; and
determining whether the strength of the touch detection signal at the current time is greater than or equal to the acquired strength threshold, and concluding that the stylus is in contact with the touch screen at the current time if the strength of the touch detection signal at the current time is greater than or equal to the strength threshold.

Embodiments of the present disclosure further provide a touch chip. The touch chip includes: a detection module and a microcontroller; wherein the detection module is configured to detect a touch detection signal transmitted between a stylus and a touch screen at a current time and determine a strength of the touch detection signal; and the microcontroller is configured to determine whether the strength of the touch detection signal at the current time is greater than or equal to the acquired strength threshold, and conclude that the stylus is in contact with the touch screen at the current time if the strength of the touch detection signal at the current time is greater than or equal to the strength threshold.

Embodiments of the present disclosure further provide an electronic device. The electronic device includes the touch chip according to embodiments of the present disclosure.

Embodiments of the present disclosure further provide a touch system. The touch system includes a stylus and the electronic device according to embodiments of the present disclosure.

In the technical solutions according to embodiments of the present disclosure, a recorded strength threshold of a touch detection signal is acquired, and a strength of a touch detection signal transmitted between a stylus and a touch screen at a current time is determined; and whether the strength of the touch detection signal at the current time is greater than or equal to the acquired strength threshold is determined, and it is concluded that the stylus is in contact with the touch screen at the current time if the strength of the touch detection signal at the current time is greater than or equal to the strength threshold. In this way, in the process that the stylus approaches the touch screen, as long as the stylus is in contact with the touch screen, it may be determined that the stylus performs a touch operation on the touch screen, the touch operation is further responded, thereby improving user experience.

BRIEF DESCRIPTION OF THE DRAWINGS

Some specific embodiments of the present disclosure are described in detail hereinafter in an exemplary fashion instead of a non-limitative fashion with reference to the accompanying drawings. In the drawings, like reference numerals denote like or similar parts or elements. A person skilled in the art should understand that these drawings are drawn to scale. Among the drawings.

DETAILED DESCRIPTION

Nevertheless, it is not necessary to require that any technical solution according to the embodiments of the present disclosure achieves all of the above technical effects.

Specific implementations of the embodiments of the present disclosure are further described hereinafter with reference to the accompanying drawings of the present disclosure.

Prior to description of the present disclosure, operating principles of touch are briefly described.

Implementation of touch input mainly depends on a resistive screen and a capacitive screen. With respect to the resistive screen, the capacitive screen has a high flexibility and eases implementation of multi-point control, and is thus extensively applied. The capacitive screens are further categorized into a surface capacitive screen and a projected capacitive screen. In a surface capacitive touch screen, electrodes are led out from four corners of the screen, and the basic principle thereof lies in sensing the position of a touch point by detecting changes of capacitance when a conductor is approaching. Projected capacitive touch screens are further categorized into a mutual-capacitive touch screen and a self-capacitive touch screen. The mutual-capacitive touch screen includes two groups of vertical electrode arrays and a touch screen controller. One of the electrode arrays serves as a drive electrode, and the other electrode array serves as a detection electrode. A mutual-capacitor is defined between the drive electrode and the detection electrode. The drive electrode transmits a drive signal under driving by a drive module of the touch screen controller, and the detection electrode receives the drive signal. When a grounded conductor (for example, a finger) approaches the capacitive screen, a capacitance value of the mutual-capacitor between the drive electrode and the detection electrode is affected, and the position of the touch point is determined by detecting the capacitance value of the mutual-capacitor. In the self-capacitive touch screen, all the electrodes define self-capacitors to the ground, the touch screen controller may drive an electrode, and afterwards detect changes of capacitance value of the self-capacitor of the electrode to determine whether a grounded conductor is present in the vicinity to thus determine the position of the touch point.

Figure 1:
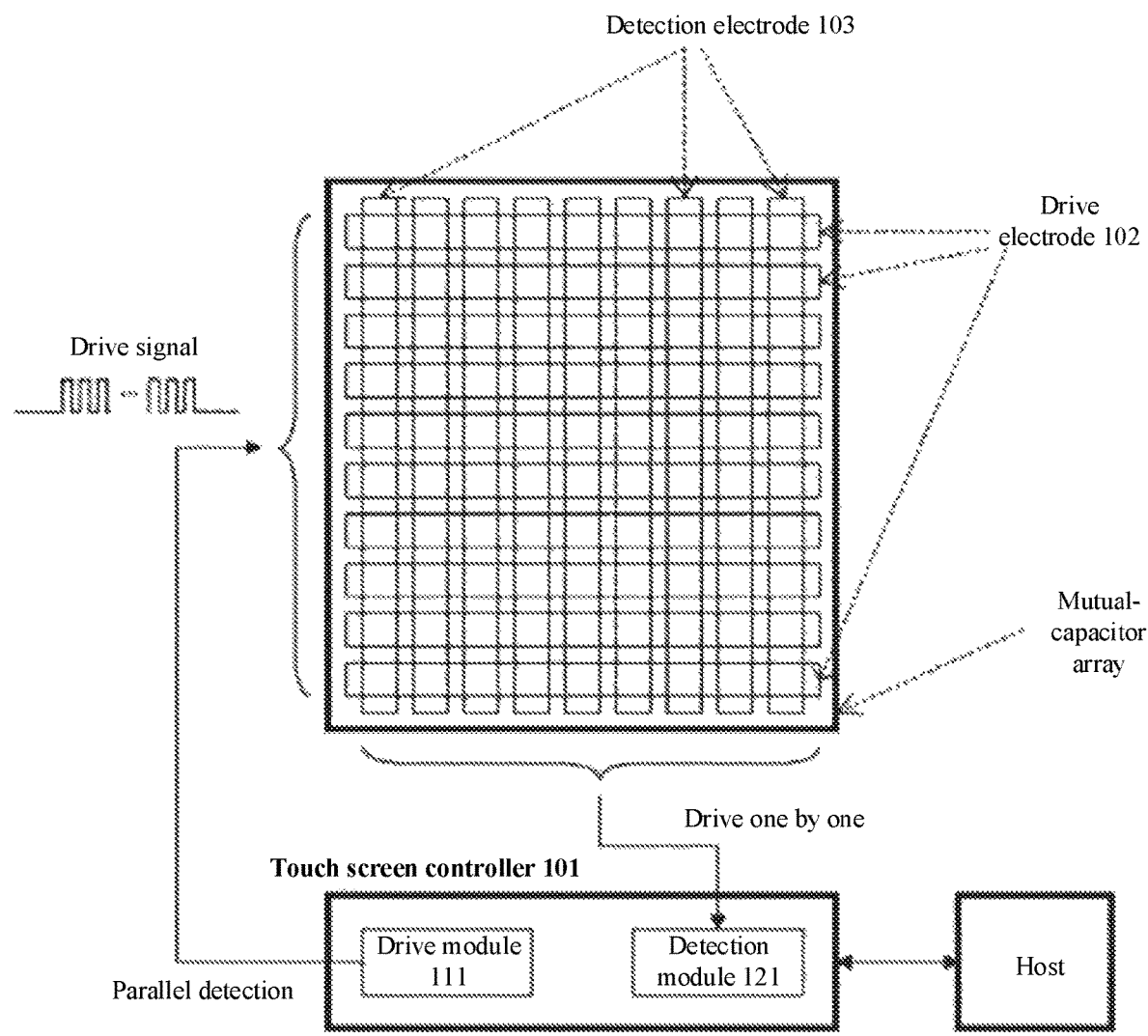
FIG. 1 is a schematic structural diagram illustrating principles of capacitive touch according to an embodiment of the present disclosure.

FIG. 1 is a schematic structural diagram illustrating principles of capacitive touch according to an embodiment of the present disclosure. As illustrated in FIG. 1, using a touch screen with a mutual-capacitive array as an example, a touch screen controller 101 included in a touch chip includes a drive module 11 and a detection module 121, an elongated drive electrode 102 defines a drive channel, and an elongated detection electrode 103 defines a detection channel.

In this embodiment, the drive module 111 sends a drive signal to drive the drive electrodes 102 one by one, the drive electrodes 102 may X-axis conductive strips, and Y-axis conductive strips are all the detection electrodes 103 (in another embodiment, the drive electrodes may be the Y-axis conductive strips, and the detection electrodes may be the X-axis conductive strips). The drive signal may be a pulse train or a set of sinusoidal waves or a set of triangular waveforms or the like (FIG. 1 merely illustrates waveforms of a pulse train), and a pulse train includes a plurality of pulses.

When a drive electrode 102 is driven, the drive signal may be coupled to the detection electrode 103 by passing through the mutual-capacitance between the drive electrode 102 and the detection electrode 103. If a conductor is in contact with or approaching the drive electrode 102 and the detection electrode 103, a value of the mutual-capacitance between the drive electrode 102 and the detection electrode 103 may be changed.

Further, the detection module 121 detects output signals of a plurality of detection electrodes one by one or parallelly, determines a capacitance value of each mutual-capacitor in a mutual-capacitor array and compares the capacitance value with a capacitance value when no conductor is in contact with or approaching the capacitor, to obtain a capacitance value change image, calculates a position of the conductor according to the capacitance value change image, and sends the position to a host to perform related touch operations.

Nevertheless, persons of ordinary skill in the art may also understand that in another embodiment, the drive electrode 102 and the detection electrode 103 may also be a rectangular shape or a rhombus shape or the like shape. In FIG. 1, the drive electrode 102 and the detection electrode 103 are exemplarily illustrated as strip shapes.

Figure 2:
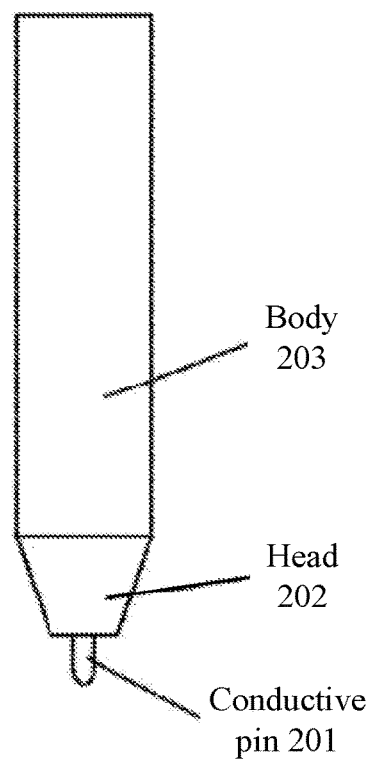
FIG. 2 is a general structural diagram of a stylus according to an embodiment of the present disclosure.

FIG. 2 is a general structural diagram of a stylus according to an embodiment of the present disclosure. As illustrated in FIG. 2, in this embodiment, the stylus includes a conductive tip 201, a head 202 and a body 203.

Figure 3:
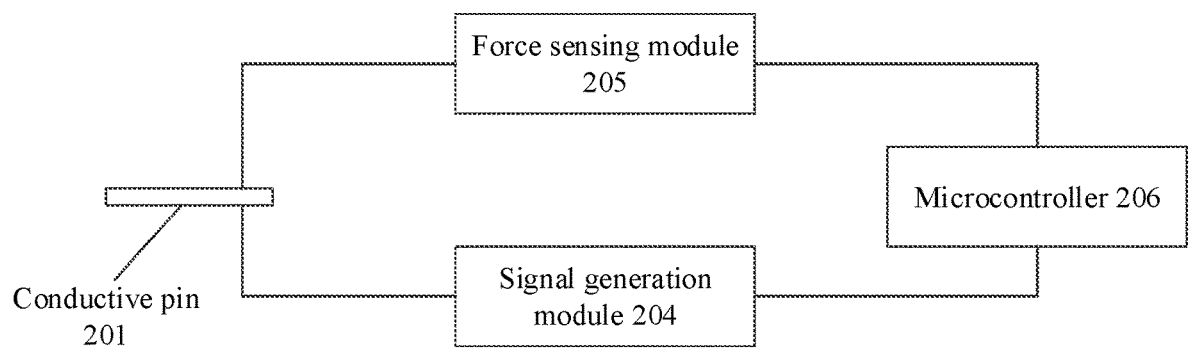
FIG. 3 is a schematic structural diagram of circuit functionality of the stylus in FIG. 2 according to an embodiment of the present disclosure.

FIG. 3 is a schematic structural diagram of circuit functionality of the stylus in FIG. 2 according to an embodiment of the present disclosure. As illustrated in FIG. 3, in this embodiment, in addition to a power source (not illustrated in FIG. 3), the stylus further includes a signal generation module 204, a force sensing module 205 and a microcontroller 206 that are arranged inside the body 203 of the stylus. The conductive pin 201 is electrically connected to the signal generation module 204 and the force sensing module 205.

In this embodiment, the conductive pin 201 is connected to body 203 by mechanical contact. In one aspect, the conductive pin serves as a tool for tapping a target region of the touch screen; and in another aspect, the conductive pin serves as a coupling means to couple a touch detection signal output by the signal generation module 204 to the electrodes (the drive and detection electrodes) of the touch screen. In still another aspect, a force sustained by the conductive pin is sensed by the force sensing module 205, and force characteristic data is generated, which may assist determination operation on whether the stylus is in contact with the touch screen.

Specifically, the signal generation module 204 outputs a touch detection signal according to a predefined protocol. When the force sensing module 205 is expected to output force characteristic data, the touch detection signal may include such information as the force characteristic data identified by the force sensing module 205.

After the stylus is in contact with the touch screen, a strength of the touch detection signal received by the electrode remains substantially unchanged. Therefore, a strength threshold of the touch detection signal corresponds to a strength of the touch detection signal when the stylus is in contact with the touch screen in the process of approaching the touch screen. When the stylus is in contact with the touch screen, if the touch screen is continuously pressed, the force characteristic data may change. However, the strength of the touch detection signal remains unchanged. Accordingly, for control of the touch precision, the strength threshold may be such defined that the strength threshold is not greater than the strength of the touch detection signal when the stylus is in contact with the touch screen.

Hereinafter, description is given using a scenario where the stylus as illustrated FIG. 2 and FIG. 3 touches the touch screen as illustrated in FIG. 1 as an example.

The technical solutions according to the embodiments of the present disclosure are exemplarily illustrated in combination with the above touch detection principles.

Figure 4:
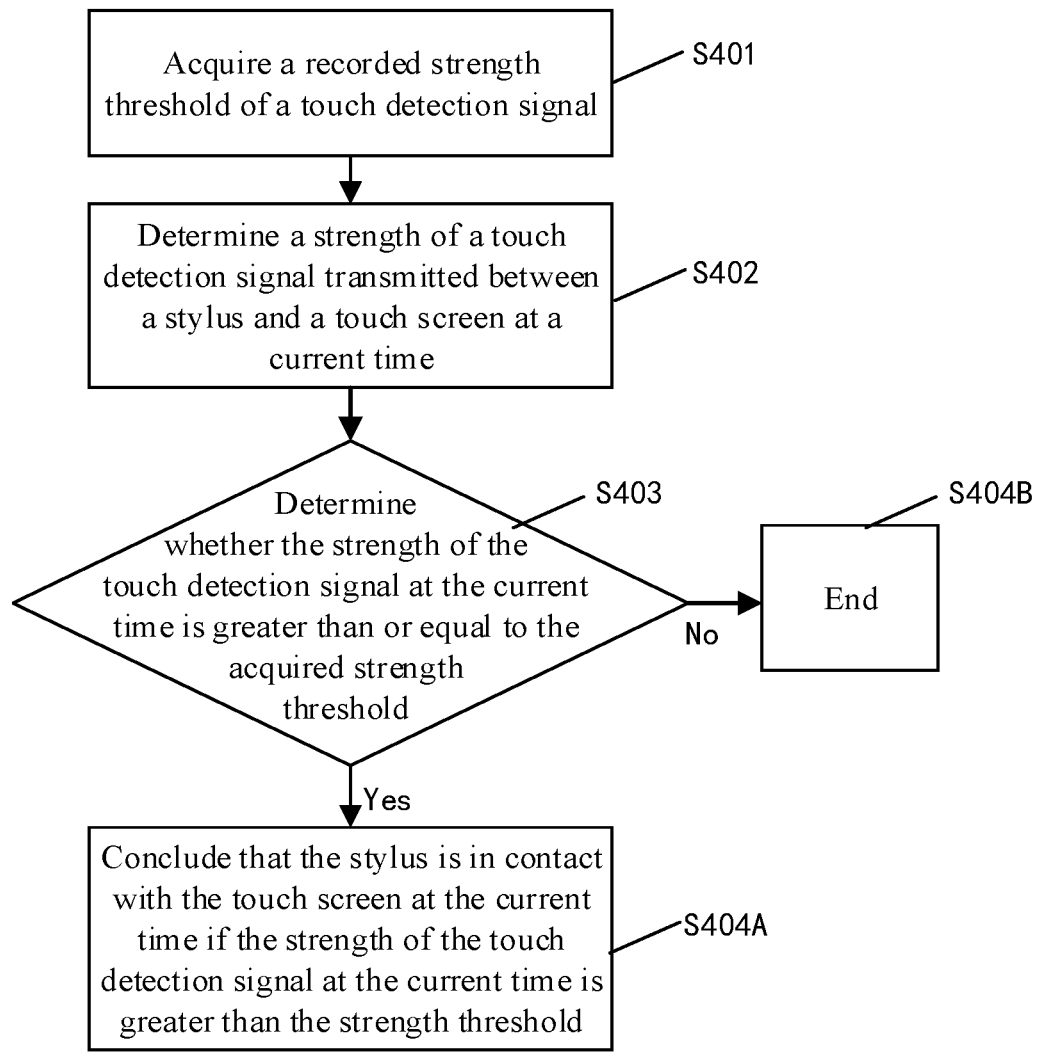
FIG. 4 is a schematic flowchart of a touch sensing method according to an embodiment of the present disclosure.

FIG. 4 is a schematic flowchart of a touch sensing method according to an embodiment of the present disclosure. As illustrated in FIG. 4, the method may include steps S401 to S404 as follows:

S401: A recorded strength threshold of a touch detection signal is acquired.

In this embodiment, the strength threshold may be specifically locally recorded in a terminal where a touch screen is located. When step S401 is performed, a touch chip acquires the strength threshold locally stored in the terminal.

In this embodiment, touch detection signals coupled to the electrodes of the touch screen are pre-collected when a stylus is in contact with a plurality of sampling positions on the touch screen. The pre-collected touch detection signals may also be referred to as touch detection signal samples. These touch detection signal samples are analyzed to determine an average strength thereof, and the average strength is used as the above strength threshold.

With respect to the determining the strength threshold by pre-collecting the touch detection signals, the touch detection signals may be specifically pre-collected before the product is delivered from factory, or the touch detection signals may be pre-collected during the use in a fashion similar to acquiring fingerprint data and establishing a fingerprint sample. Assuming that a touch operation needs to be performed on the touch screen by the stylus at a current time t1 (that is, a current time), then signal strengths of touch detection signals sent by the stylus to the touch screen when the stylus is in contact with the touch screen are recorded, and the recorded signal strengths are averaged to obtain an average signal strength. The average signal strength is the above strength threshold, which is a basis for determining whether the stylus is in contact with the touch screen at the current time t1.

In a specific application scenario, if the touch detection signal is a voltage signal, the strength threshold corresponding to an amplitude of the voltage signal.

In this embodiment, a general strength threshold is defined for all the touchable positions on the touch screen. That is, no matter which effective touch position on the touch screen is touched, the strength needs to be compared with the same strength threshold in step 403.

S402: A strength of a touch detection signal transmitted between a stylus and a touch screen at a current time is determined.

In this embodiment, the transmitting may be specifically sending or pulling. The detection module simultaneously scans a plurality of rows of channels, including a drive channel and a sensing channel. A conductive pin 201 of the stylus may define a coupling capacitance with electrodes (including a drive electrode and a detection electrode) on the touch screen. The smaller a distance between the electrodes of the touch screen and the conductive pin, the greater a value of the coupling capacitance between the conductive pin and the electrodes (including the drive electrode or the detection electrode) of the touch screen. As such, the strength of the touch detection signal coupled by the conductive pin 201 to the touch screen is great.

In this embodiment, the touch chip determines the strength of the touch detection signal sent by the stylus to the touch screen at the current time (t1), and the detection is specifically performed by the detection module as illustrated in FIG. 1.

Specifically, in a specific application scenario, since in the process where the stylus is approaching to be in contact with the touch screen, the touch detection signal sent by the stylus is gradually coupled to the electrode of the touch screen via the conductive pin, the electrode of the touch screen receives a greater and greater touch detection signal. In accordance with this principle, during determining whether the stylus is in contact with the touch screen, the electrodes of the touch screen are scanned in real time by the detection module as illustrated in FIG. 3, and the strength of the received touch detection signal is determined. The strength is differenced from the strength of the signal received by the electrode when no stylus is approaching the touch screen to obtain a strength difference. The strength difference is the strength of the touch detection signal sent by the stylus to the electrode of the touch screen.

S403: Whether the strength of the touch detection signal at the current time is greater than or equal to the acquired strength threshold is determined; and if the strength of the touch detection signal at the current time is greater than or equal to the strength threshold, step S404A is performed, and otherwise, step S404B is performed.

In this embodiment, the above strength difference may be specifically compared with the strength threshold, and if a comparison result is close to 0, it may be determined that the strength of the touch detection signal is greater than or equal to the acquired strength threshold.

In a specific application scenario, as described above, the touch detection signal is a voltage signal, and the above determining process may be performed by a comparison of the amplitude of the voltage signal.

Further, in this embodiment, the above comparison process may be performed by hardware or software.

S404A: If the strength of the touch detection signal at the current time is greater than the strength threshold, it is determined that the stylus is in contact with the touch screen at the current time.

S404B: The process ends.

In this embodiment, the contact includes initial contact, or sufficient contact with the touch screen after the initial contact. Specifically, if the strength of the touch detection signal at the current time is equal to the strength threshold, it may be determined that the stylus is initially in contact with the touch screen gradually. If the strength of the touch detection signal at the current time is greater than the strength threshold, it may be determined that the stylus is sufficiently in contact with the touch screen gradually.

As described above, in this embodiment, since a general strength threshold is defined for all the effective touch positions on the touch screen, it is determined whether the stylus is initially in contact with or sufficiently in contact with the touch screen simply according to the relationships (greater or equal) between the strength and the strength threshold.

Figure 5:
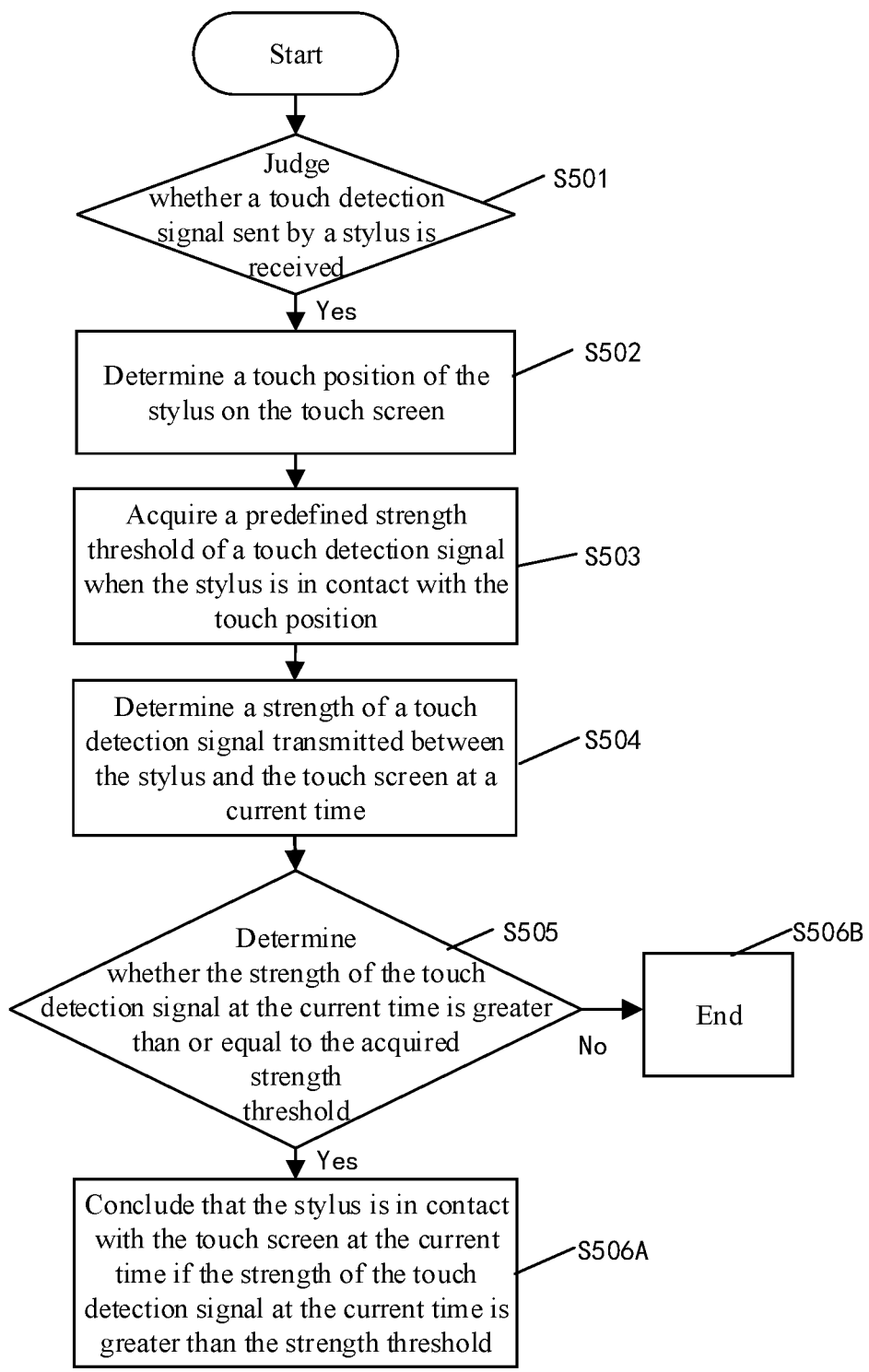
FIG. 5 is a schematic flowchart of a touch sensing method according to an embodiment of the present disclosure.

FIG. 5 is a schematic flowchart of a touch sensing method according to an embodiment of the present disclosure. As illustrated in FIG. 5, the method includes the following steps:

S501: Whether a touch detection signal sent by a stylus is received is determined; and if the touch detection signal is received, step S502 is performed.

In this embodiment, as described above, step S501 is performed by the detection module as illustrated in FIG. 1. To ease of the determination operation in step S501, in this embodiment, during use, in the process where the stylus is approaching or in contact with a touch screen, a detection module in a touch chip scans electrodes one by one. When the electrode is far away from the conductive pin of the stylus, the strength of the touch defection signal coupled to the electrode is weak. If the touch detection signal is outside an effective detection range of the detection module, the detection module even fails to detect the touch detection signal. When the conductive pin is approaching the electrode, the detection module may detect a touch control signal, and a strength of the touch detection signal is gradually increasing.

S502: A touch position of the stylus on the touch screen is determined.

In this embodiment, a drive signal is provided for a drive electrode by a drive module in the touch screen, and then the touch position is determined with reference to changes of a capacitance amount of mutual-capacitors as described in the touch detection principles in FIG. 1.

In this embodiment, for the sake of coupling a touch detection signal with a sufficiently great strength to the electrode of the touch screen, a touch detection signal output by a signal generation module preferably has a high strength. For example, if the touch detection signal is a voltage signal, the voltage, for example, 40 V, may be correspondingly designed to withstand a voltage of 40 V.

S503: A predefined strength threshold of a touch detection signal when the stylus is in contact with the touch position is acquired.

In this embodiment, in step S503, different from the embodiment as illustrated in FIG. 4, the touch screen is partitioned into a plurality of effective touch regions, and a strength threshold as described above is defined for each of the effective touch regions. A corresponding relationship between the effective touch region and the strength threshold may be embodied in the form of an indexing table. For example, an identifier is assigned to each of the effective touch region, and the corresponding effective touch region is associated with the strength threshold by this identifier. It should be noted that the effective touch regions may be differentiated by the covered drive electrode and detection electrode.

S504: A strength of a touch detection signal transmitted between the stylus and the touch screen at a current time is determined.

In this embodiment, if a force detection module in the stylus outputs effective force characteristic data, it indicates that the stylus is in contact with the touch screen, and in this case, the detection module detects the strength of the touch detection signal.

S505: Whether the strength of the touch detection signal at the current time is greater than or equal to the acquired strength threshold is judged; and if the strength of the touch detection signal at the current time is greater than or equal to the strength threshold, step S506A is performed, and otherwise, step S506B is performed.

In this embodiment, similar to the above embodiment, the above strength difference may be specifically compared with the strength threshold, and if a comparison result is close to 0, it may be determined that the strength of the touch detection signal is approximately equal to the acquired strength threshold. If the comparison result is 0, it may be determined that the strength of the touch detection signal is greater than the acquired strength threshold.

In a specific application scenario, as described above, the touch detection signal is a voltage signal, the above judgment process may be performed by a comparison of the amplitude of the voltage signal.

Further, in this embodiment, the above comparison process may be performed by hardware or software.

S506A: If the strength of the touch detection signal at the current time is greater than the strength threshold, it is concluded that the stylus is in contact with the touch screen at the current time.

In this embodiment, similar to the above embodiment, the contact includes initial contact, or sufficient contact with the touch screen after the initial contact. Specifically, if the strength of the touch detection signal at the current time is equal to the strength threshold, it may be concluded that the stylus is initially in contact with the touch screen gradually. If the strength of the touch detection signal at the current time is greater than the strength threshold, it may be concluded that the stylus is sufficiently in contact with the touch screen gradually.

S506B: The process ends.

Figure 6:
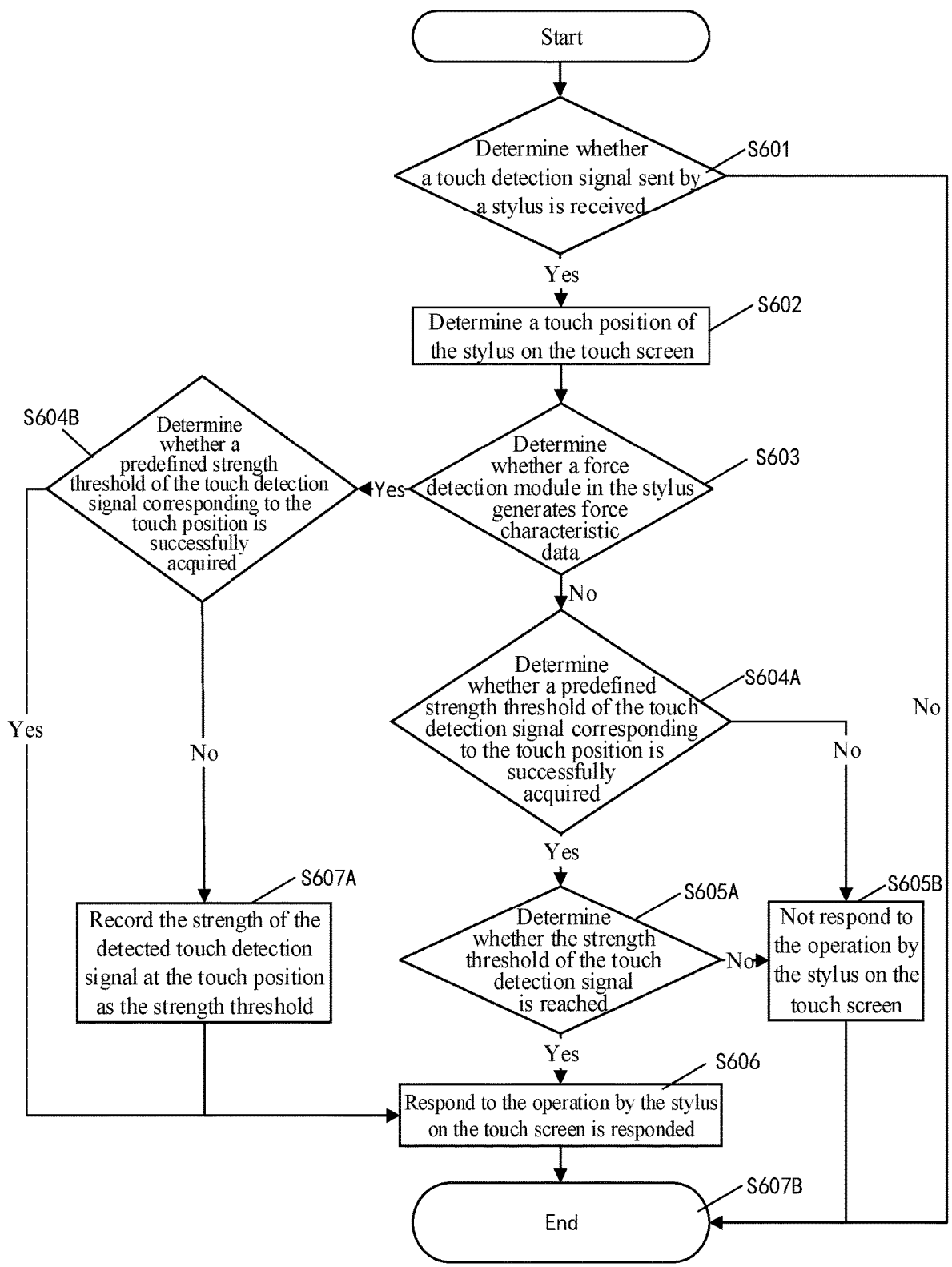
FIG. 6 is a schematic flowchart of a touch sensing method according to an embodiment of the present disclosure.

FIG. 6 is a schematic flowchart of a touch sensing method according to an embodiment of the present disclosure. As illustrated in FIG. 6, the method includes the following steps:

S601: Whether a touch detection signal sent by a stylus is received is judged; and if the touch detection signal is received, step S602 is performed, and otherwise step S607B is performed.

In this embodiment, step S601 is similar to step S501 in the embodiment as illustrated in FIG. 5. That is, in the process where the stylus is approaching or in contact with the touch screen during use, a detection module in a touch chip scans the electrodes; and when the electrode of the touch screen is far away from the conductive pin of the stylus, the strength of the touch detection signal detected on the electrode is weak; and in this case, it may be considered that the touch detection signal is not within the range of effective detection of the detection module, which is approximately considered that the detection module fails to detect any signal. When the conductive pin is approaching the electrode, the detection module may detect a touch control signal on the electrode, and a strength of the touch detection signal is gradually increasing.

S602: A touch position of the stylus on the touch screen is determined.

In this embodiment, with reference to the principles of determining the touch position as illustrated in FIG. 1, the position of the stylus on the touch screen is determined.

S603: Whether a force detection module in the stylus generates force characteristic data is judged; and if the force detection module generates the force characteristic data, step S604B is performed, and otherwise, step S604A is performed.

In this embodiment, when the conductive pin of the stylus is in contact with the touch screen, the conductive pin may be subjected to a force. When the force reaches a sensing range of a force sensing module, the force sensing module wakes up a microcontroller from a sleep state. The microcontroller determines the magnitude of the force by receiving the force characteristic data generated by the force sensing module. Further, the microcontroller controls a signal generation module to code the force characteristic data to the touch detection signal in accordance with a predefined protocol. When the force sensing module fails to sense a force within a predefined time period, that is, no force characteristic data are generated, the microcontroller enters the sleep state to reduce power consumption.

In this embodiment, since the force characteristic data may be coded in the touch detection signal if the force detection module generates the force characteristic data, the touch chip may parse the touch detection signal detected by the detection module, and determine whether the touch detection signal includes the force characteristic data. If the force detection apparatus generates the force characteristic data, it may be considered that the stylus is in contact with the touch screen; and otherwise, it indicates that the force detection apparatus generates no force characteristic data, that is, the stylus is not in contact with the touch screen.

However, it should be noted that whether the force detection apparatus generates the force characteristic data is substantially only related to the fact that whether the stylus is in contact with the touch screen, but is not related to other factors, for example, the case where the force detection apparatus fails to generate the force characteristic data due to failure or the other of the force detection apparatus, or the case where whether the touch detection signal includes the force characteristic data may not be determined due to failure of the detection module.

S604A: Whether a predefined strength threshold of the touch detection signal corresponding to the touch position is successfully acquired is judged; and if the predefined strength threshold is successfully acquired, step S605A is performed, and otherwise, step S605B is performed.

In this embodiment, step S604A may be performed by the touch chip, because the strength threshold of the touch detection signal may be locally pre-recorded in an electronic device employing the touch chip. For ease of subsequent steps, the touch chip may firstly acquire the strength threshold of the touch detection signal from the electronic device, further, the subsequent steps may be performed according to a result indicating whether the strength threshold is successfully acquired, and finally, whether a touch operation by the stylus on the touch screen at a current time is responded or not is determined.

As described above, similar to step S503, in this embodiment, a touch area of the touch screen is partitioned into a plurality of effective touch regions. Each of the effective touch regions corresponds to a strength threshold as described above. That is, such a strength threshold is defined for each of the effective touch regions. A corresponding relationship between the effective touch region and the strength threshold may be embodied in the form of an indexing table. For example, an identifier is assigned to each of the effective touch region, and the corresponding effective touch region is associated with the strength threshold by this identifier. It should be noted that the effective touch regions may be differentiated by the covered drive electrode and sensing electrode.

In a specific application scenario, by specifically comparing coordinates of the touch position at the current time with coordinates of the effective touch regions, which effective touch region the touch position at the current time is located is firstly determined, and then the strength threshed of the corresponding touch detection signal is acquired by indexing.

S604B: Whether the predefined strength threshold of the touch detection signal corresponding to the touch position is successfully acquired is judged; and if the predefined strength threshold is successfully acquired, the process skips to step S 606, and otherwise, step S607A is performed.

In this embodiment, different from execution of step 604A, to ease of determining whether the stylus is in contact with the touch screen at a next time, the strength threshold of the touch detection signal is defined in real time. If the stylus is not in contact with the touch screen, by step S607A, it is concluded that the stylus has been in contact with the touch screen according to the force characteristic data, and a strength threshold of the touch detection signal is configured for the stylus at the touch position of the touch screen, such that it is subsequently judged whether the stylus is in contact with the touch position at the next time, and the strength threshold of the touch detection signal configured at the touch position is further acquired.

S605A: Whether the strength threshold of the touch detection signal is reached is judged; and if the strength threshold is reached, step S606 is performed, and otherwise, step 605B is performed.

In this embodiment, step S605A is similar to the above embodiment.

S605B: The operation by the stylus on the touch screen is not responded.

In this embodiment, the touch chip does not send the coordinates of the touch position, that is, a host fails to receive the coordinates of the touch position sent by the touch chip and the operation by the stylus on the touch screen is not further responded. In this case, it indicates that the stylus is not effectively in contact with the touch screen.

It should be noted that execution of step S605 is mainly based on whether an effective contact is formed between the stylus and the touch screen according to the strength threshold, with no need to consider other factors, for example, the touch chip fails to successfully send the coordinates of the touch position, or the touch chip sends the coordinates of the touch position but the host fail to receive the coordinates of the touch position from the touch chip due to failure of the host.

S606: The operation by the stylus on the touch screen is responded.

In this embodiment, after the coordinates of the touch coordinates are calculated by the touch chip, the coordinates may be sent to the host for implementing the touch operation function, for example, implementing any hand gesture operation such as writing on the touch screen by the stylus (the stylus writes fluently).

Nevertheless, in specific practice, if the stylus is actually in contact with the touch screen, but the touch chip fails to successfully send the coordinates of the touch position or the host fails to receive the coordinates of the touch position from the touch chip, a retransmission mechanism may be defined to address the issue of sending the coordinates of the touch position or receiving the coordinates of the touch position, until the host successfully receives the coordinates of the touch position sent by the touch chip. Herein, a threshold of a retransmission count may be defined in the retransmission mechanism. If the retransmission count exceeds a count threshold, the process may skip to step S607B to terminate the processing at the current time.

S607A: The strength of the detected touch detection signal at the touch position is recorded as the strength threshold, and the process skips to step S606.

With respect to a next time t2, prior to step S601, before the recorded strength threshold of the touch detection signal is acquired, a strength threshold of the touch detection signal is defined and recorded according to the force characteristic data applied by the stylus to the touch screen at the current time. That is, according to the strength of the touch detection signal transmitted between the stylus and the touch screen in the process where the stylus performs a touch operation for the touch screen at the current time t, the strength threshold of the touch detection signal at the next time t2 is defined and recorded.

When a strength threshold as described above is defined for each of the effective touch regions, a signal strength of the touch detection signal generated when the stylus is in contact with any position in each of the effective touch regions may be selected as a general strength threshold of the touch detection signal in the touch region.

It should be noted that the execution process of the above method is understood as an execution cycle. When the process needs to be repeatedly performed, skipping relationships between the steps may be flexible defined according to the actual needs.

For example, if the strength of the touch detection signal detected by the detection module is not greater than a predefined strength threshold, the detection process is repeatedly performed. For prevention of a dead cycle, a count of repeated detections may be defined. When the predetermined count is reached, but the touch detection signal whose strength is greater than the predefined strength threshold is not detected yet, the current process ends, and the operation by the stylus on the touch screen at the current time is not responded. Afterwards, the process in the above method embodiment is continuously performed within a next time.

An embodiment of the present disclosure provides a touch chip. The touch chip includes: a detection module and a microcontroller; wherein the detection module is configured to detect a touch detection signal transmitted between a stylus and a touch screen at a current time and determine a strength of the touch detection signal; and the microcontroller is configured to judge whether the strength of the touch detection signal at the current time is greater than or equal to the acquired strength threshold, and conclude that the stylus is in contact with the touch screen at the current time if the strength of the touch detection signal at the current time is greater than or equal to the strength threshold.

An embodiment of the present invention provides an electronic device. The electronic device includes the above described touch chip.

It should be noted that, in another embodiment, if the force characteristic data is acquired at the current time t1, and it is determined through a plurality of determination operations that the strength of the touch detection signal is still less than the strength threshold, the strength threshold of the touch detection signal is updated. Specifically, through a plurality of determination operations, if it is determined that the strength of the touch detection signal is still less than the strength threshold, it indicates that the defined strength threshold is over-great, and thus a smaller strength threshold needs to be defined. In specific practice, the strength of the touch detection signal detected by the detection module at the current time t1 may be used as an updated strength threshold, such that whether the stylus is in contact with the touch screen is determined again at the next time t2.

In addition, in another embodiment, the touch chip may detect an included angle between the stylus and the touch screen. Accordingly, at the same touch position, strength thresholds of a plurality of touch detection signals are defined. The strength thresholds of the touch detection signals are correspondingly are associated with different included angles.

The touch detection signal generated by the signal generation apparatus in the stylus by coding may further include information of the included angle between the stylus and the touch screen. The touch chip decodes the touch detection signal to acquire the strength thresholds of the different touch detection signals at different included angles. Further, during determining whether the strength of the touch detection signal at the current time is greater than or equal to the strength threshold of the touch detection signal, a corresponding strength threshold when the stylus and the touch screen define, at the touch position, the included angle at the current time is firstly determined, and then the strength of the touch detection signal at the current time is compared with the strength threshold of the touch detection signal.

In addition, it should be noted that, in the above embodiment, the contact may be a practical physical contact, or an approximately practical physical contact between the stylus and the touch screen. For example, a smaller distance is defined between the stylus and the touch screen. In the case of a smaller distance, as described above, the strength threshold is defined to be less than the strength of the touch detection signal when the practical physical contact is formed between the stylus and the touch screen.

The electronic device in the embodiments of the present disclosure is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

Theretofore, the specific embodiments of the subject have been described. Other embodiments fall within the scope defined by the appended claims. In some cases, the actions or operations disclosed in the claims may be performed in a different sequence, and an expected result is still attainable. In addition, illustrations in the drawings do not necessarily require a specific sequence or a continuous sequence, to attain the expected result. In some embodiments, multi-task processing and parallel processing may be favorable.

It should be noted that, in this specification, terms "comprises", "comprising", "has", "having", "includes", "including", "contains", "containing" or any other variation thereof, are intended to cover a non-exclusive inclusion, such that a process, method, article, or apparatus, that comprises, has, includes, contains a list of elements does not include only those elements but may include other elements not expressly listed or inherent to such process, method, article, or apparatus. On the premise of no more limitations, an element proceeded by "comprises . . . a", "has . . . a", "includes . . . a", "contains . . . a" does not, without more constraints, preclude the existence of additional identical elements in the process, method, article, or device.

For similar or identical parts in the various embodiments in the specification, reference may be made to each other. In each embodiment, the differences over other embodiments are emphasized.

Detailed above are exemplary embodiments of the present disclosure, and are not intended to limit the present disclosure. For a person skilled in the art, the present disclosure may be subjected to various modifications and variations. Any modification, equivalent replacement, or improvement made without departing from the spirit and principle of the present disclosure should fall within the protection scope of the present disclosure.

What is claimed is:

1. A touch sensing method, comprising:
   acquiring a recorded strength threshold of a touch detection signal, and determining a strength of a touch detection signal transmitted between a stylus and a touch screen at a current time; and
   determining whether the strength of the touch detection signal at the current time is greater than or equal to the acquired strength threshold, and concluding that the stylus is in contact with the touch screen at the current time if the strength of the touch detection signal at the current time is greater than or equal to the strength threshold;
   before the acquiring a recorded strength threshold of a touch detection signal, the method further comprising:
   setting and recording the strength threshold of the touch detection signal according to a strength of a touch detection signal detected when force characteristic data applied by the stylus to the touch screen is detected prior to the current time.

2. The method according to claim 1, wherein the determining a strength of a touch detection signal transmitted between a stylus and a touch screen comprises: determining a strength of a touch detection signal sent by the stylus to the touch screen.

3. The method according to claim 1, wherein the strength threshold of the touch detection signal corresponds to the strength of the touch detection signal when the stylus is in contact with the touch screen during a process of approaching the touch screen.

4. The method according to claim 1, wherein upon the concluding that the stylus is in contact with the touch screen at the current time, the method further comprises: responding to a touch operation.

5. The method according to claim 4, wherein the touch operation comprises a hand gesture operation performed by the stylus on the touch screen.

6. The method according to claim 1, wherein a touch region of the touch screen is partitioned into a plurality of effective touch sub-regions, each of the plurality of effective touch sub-regions corresponding to the strength threshold; and
   a strength threshold of a touch detection signal configured for the effective touch sub-region touched by the stylus is acquired, and a strength of a touch detection signal transmitted by the stylus between the plurality of effective touch sub-regions at the current time is determined.

7. The method according to claim 6, wherein a strength of the touch detection signal generated when the stylus is in contact with any one position in each of the plurality of effective sub-regions is selected as the strength threshold of the touch detection signal universal for the effective touch sub-region.

8. The method according to claim 1, further comprising: if the recorded strength threshold of the touch detection signal is not acquired, not responding to a touch operation corresponding to the touch detection signal.

9. The method according to claim 8, wherein the touch operation comprises a hand gesture operation performed by the stylus on the touch screen.

10. The method according to claim 9, further comprising: updating the strength threshold of the touch detection signal if force characteristic data is acquired at the current time, and it is concluded through a plurality of determination operations that the strength of the touch detection signal at the current time is still less than the strength threshold.

11. A touch chip, comprising: a detection module and a microcontroller; wherein the detection module is configured to detect a touch detection signal transmitted between a stylus and a touch screen at a current time and determine a strength of the touch detection signal; and the microcontroller is configured to determine whether the strength of the touch detection signal at the current time is greater than or equal to the acquired strength threshold, and conclude that the stylus is in contact with the touch screen at the current time if the strength of the touch detection signal at the current time is greater than or equal to the strength threshold; wherein the detection module is further configured to set and record the strength threshold of the touch detection signal according to a strength of a touch detection signal detected when force characteristic data applied by the stylus to the touch screen is detected prior to the current time.

12. The touch chip according to claim 11, wherein the detection module is configured to determining a strength of a touch detection signal sent by the stylus to the touch screen.

13. The touch chip according to claim 11, wherein the microcontroller is configured to not responding to a touch operation corresponding to the touch detection signal if the recorded strength threshold of the touch detection signal is not acquired.

14. The touch chip according to claim 13, wherein the touch operation comprises a hand gesture operation performed by the stylus on the touch screen.

15. An electronic device, comprising a touch chip, the touch chip comprising a detection module and a microcontroller; wherein the detection module is configured to detect a touch detection signal transmitted between a stylus and a touch screen at a current time and determine a strength of the touch detection signal; and the microcontroller is configured to determine whether the strength of the touch detection signal at the current time is greater than or equal to the acquired strength threshold, and conclude that the stylus is in contact with the touch screen at the current time if the strength of the touch detection signal at the current time is greater than or equal to the strength threshold; wherein the detection module is further configured to set and record the strength threshold of the touch detection signal according to a strength of a touch detection signal detected when force characteristic data applied by the stylus to the touch screen is detected prior to the current time.

* * * * *